(12) United States Patent
Le Leivre

(10) Patent No.: US 12,289,134 B2
(45) Date of Patent: Apr. 29, 2025

(54) RECONFIGURABLE ARRAY FOR RF/ANALOGUE SIGNALS

(71) Applicant: BAE SYSTEMS plc, London (GB)

(72) Inventor: Jason Le Leivre, Watchfield (GB)

(73) Assignee: BAE SYSTEMS PLC, London (GB)

( * ) Notice: Subject to any disclaimer, the term of this patent is extended or adjusted under 35 U.S.C. 154(b) by 84 days.

(21) Appl. No.: 17/928,982

(22) PCT Filed: May 26, 2021

(86) PCT No.: PCT/GB2021/051273
§ 371 (c)(1),
(2) Date: Dec. 1, 2022

(87) PCT Pub. No.: WO2021/245372
PCT Pub. Date: Dec. 9, 2021

(65) Prior Publication Data
US 2023/0224042 A1 Jul. 13, 2023

(30) Foreign Application Priority Data
Jun. 5, 2020 (GB) ..................................... 2008498

(51) Int. Cl.
*H04B 10/2575* (2013.01)
*H04Q 11/00* (2006.01)

(52) U.S. Cl.
CPC . *H04B 10/25755* (2013.01); *H04B 10/25759* (2013.01); *H04Q 11/0005* (2013.01);
(Continued)

(58) Field of Classification Search
CPC .......... H04B 10/2575; H04B 10/25755; H04B 10/25759; H04L 45/60; H04Q 11/0005; H04Q 2011/0015
See application file for complete search history.

(56) References Cited

U.S. PATENT DOCUMENTS

| 6,792,208 B1 * | 9/2004 | Mukherjee ......... H04Q 11/0062 398/55 |
| 9,693,123 B2 * | 6/2017 | Lord ................... H04J 14/0205 |

(Continued)

FOREIGN PATENT DOCUMENTS

| CN | 105282632 A | 1/2016 |
| WO | 2014155033 A1 | 10/2014 |

OTHER PUBLICATIONS

International Search Report dated Sep. 6, 2021 issued in PCT/GB2021/051273.
GB Search Report dated Nov. 9, 2020 issued in GB2007108.0.

*Primary Examiner* — Pranesh K Barua
(74) *Attorney, Agent, or Firm* — Scully, Scott, Murphy & Presser, P.C.

(57) ABSTRACT

There is described a reconfigurable array for facilitating dynamic combination and distribution of RF signals. The reconfigurable array comprises: (a) a number, $N_i$, of input devices for generating or supplying RF input signals; (b) a number, $N_o$, of output devices for analysing or forwarding RF output signals; (c) an optical switch matrix comprising a number, $N_p$, of ports, wherein each of the ports is an optical input or an optical output, wherein each input device is coupled to a respective port of the optical switch matrix at an optical input, wherein each output device is coupled to a respective port of the optical switch matrix at an optical output, and wherein the optical switch matrix is configurable to enable optical connection of any optical input to any optical output; and (d) a plurality of multi-port devices that each have multiple uncommon ports which couple to a single common port, wherein each port of each multi-port device is coupled to a respective port of the optical switch matrix, and wherein each multi-port device enables either fan-in of optical signals from the uncommon ports to the common port or fan-out of optical signals from the common (Continued)

port to the uncommon ports depending on the configuration of the reconfigurable array. The plurality of multi-port devices include at least one M:1 multi-port device, where M is a predetermined maximum number of RF signals for the reconfigurable array to fan-in or fan-out, where $M \leq N_i$ and $M \leq N_o$.

19 Claims, 6 Drawing Sheets

(52) U.S. Cl.
CPC ............... *H04Q 2011/0015* (2013.01); *H04Q 2011/0058* (2013.01)

(56) References Cited

U.S. PATENT DOCUMENTS

| | | |
|---|---|---|
| 2003/0138189 A1* | 7/2003 | Rockwell ........... H04Q 11/0005 385/24 |
| 2003/0163555 A1* | 8/2003 | Battou ............... H04J 14/0297 709/223 |
| 2005/0254820 A1 | 11/2005 | Zhou et al. |
| 2012/0183294 A1* | 7/2012 | Boertjes ............. H04J 14/0238 398/49 |
| 2016/0057513 A1 | 2/2016 | Lord |
| 2016/0057514 A1* | 2/2016 | Lord .................. H04J 14/0217 398/50 |
| 2016/0091665 A1* | 3/2016 | Jones ................. H04B 10/801 385/2 |
| 2019/0064353 A1 | 2/2019 | Nugent, Jr. et al. |
| 2020/0033458 A1 | 1/2020 | Stryjewski et al. |

* cited by examiner

RECONFIGURABLE ARRAY FOR RF/ANALOGUE SIGNALS

FIELD OF THE INVENTION

The present invention relates to a reconfigurable array for facilitating dynamic combination and distribution of RF/analogue signals.

BACKGROUND OF THE INVENTION

Light can be modulated by a data-carrying radio frequency signal and transmitted over an optical fibre link. This is referred to as RF over fibre (or radio over fibre). There are many communications applications of RF over fibre, including transmission of mobile radio signals (3G, 4G, 5G and WiFi) and cable television signals. RF over fibre is also used in satellite base station communications. Fibre optic links are advantageous because they provide lower transmission losses and reduced sensitivity to noise and electromagnetic interference compared to all-electrical signal transmission. Thus, RF over fibre can be used to transport analogue RF signals of very high bandwidth over long distances with very low loss and electromagnetic isolation from the environment. The present application aims to provide a versatile solution in terms of distribution of RF signals which provides various advantages over those of the prior art.

SUMMARY OF THE INVENTION

According to the present invention, there is provided a reconfigurable array for facilitating dynamic combination and distribution of RF/analogue signals. The reconfigurable array comprises: a number ($N_i$) of input devices for generating or supplying RF/analogue input signals; a number ($N_o$) of output devices for analysing or forwarding RF/analogue output signals; an optical switch matrix comprising a number ($N_p$) of ports; and a plurality of splitters/combiners that each have multiple uncommon ports which couple to a single common port. Each of the ports of the optical switch matrix is an optical input or an optical output. Each input device is coupled to a respective port of the optical switch matrix at an optical input, and each output device is coupled to a respective port of the optical switch matrix at an optical output. The optical switch matrix is configurable to enable optical connection of any optical input to any optical output. Each splitter/combiner enables either fan-in of optical signals from the uncommon ports to the common port or fan-out of optical signals from the common port to the uncommon ports. Each port of each splitter/combiner is coupled to a respective port of the optical switch matrix. The plurality of splitters/combiners include at least one M:1 splitter/combiner, where M is a predetermined maximum number of RF/analogue signals for the reconfigurable array to fan-in or fan-out, where $M \leq N_i$ and $M \leq N_o$.

An alternative for achieving fan-out uses a tuneable optical filter architecture. However, such an arrangement band limits very wideband RF signals and generally has a deleterious effect on linearity. In contrast, the present reconfigurable array has no bandwidth limiting optical features.

An alternative for achieving fan-in is described below in relation to FIG. 1. However, as will be discussed below, this solution is not scalable. In contrast, the present reconfigurable array is completely scalable and may be designed to enable unconstrained fan-in/fan-out for all input and output devices, or may be constrained to limit the fan-in/fan-out options by means of the number M.

The input devices may include one or more of: a receiving antenna; a software defined radio, SDR, transmitter; and an RF/analogue signal generator.

The output devices include one or more of: a transmitting antenna; an SDR receiver; and an RF/analogue signal analyser.

Each input device may be coupled to the respective port of the optical switch matrix by means of a respective electrical-to-optical (E/O) converter configured to convert the respective RF/analogue signal into a corresponding optical signal for distribution through the optical switch matrix. The E/O converters for each of the input devices may be configured to generate optical signals having different optical wavelengths to one another.

Each output device may be coupled to the respective port of the optical switch matrix by means of a respective optical-to-electrical (O/E) converter configured to convert an optical signal received from the optical switch matrix into an RF/analogue signal for analysis or onward transmission by the output device. Each O/E converter may be configured to provide automatic gain control by controlling a respective RF/analogue amplifier based on a measured light level of the received optical signal so as to adjust an output power of the respective RF/analogue signal to a predetermined level.

The plurality of splitters/combiners may include duplicate splitters/combiners to provide redundancy in case of failure of one or more of the plurality of splitters/combiners.

In a first embodiment, the optical switch matrix is an any-to-any optical switch matrix, where each of the ports is reconfigurable as either an optical input or an optical output, and where the any-to-any optical switch matrix is configurable to enable optical connection of any one of the ports to any other one of the ports.

In the first embodiment, the plurality of splitters/combiners may be defined as follows: (a) A is defined as $\max(N_i, N_o)$ and B is defined as $\min(N_i, N_o)$, (b) for $i=1, 2, \ldots$, the $i^{th}$ splitter/combiner is an $X_i$:1 splitter/combiner, where $X_i = A/i$ rounded down to the nearest integer, (c) if $X_i < 2$, the $i^{th}$ splitter/combiner is excluded from the plurality of splitters/combiners and the number of splitters/combiners in the plurality of splitters/combiners is defined as S, and (d) the total number of ports is given by $p = N_i + N_o + \sum_{i=1}^{S}(X_i+1)$.

In one example of the first embodiment, M=A such that the reconfigurable array is unconstrained to enable fan-in from all of the input devices or fan-out to all of the output devices if desired. Alternatively, M<A such that the reconfigurable array is constrained to enable fan-in from a maximum of M input devices or fan-out to a maximum of M output devices, wherein each $X_i$ is constrained by $X_i \leq M$.

In a second embodiment, the optical switch matrix is a C×D optical switch matrix having a number (C) of ports on one side and a number (D) of ports on the other side, where $C \leq D$, and where the C×D optical switch matrix 630 is configurable to enable optical connection of any of the C ports on the one side to any of the D ports on the other side. In the second embodiment, the plurality of splitter/combiners comprises a first set of splitters/combiners having their uncommon ports connected to respective ones of the D ports of the optical switch matrix and having their common ports connected to respective ones of the C ports of the optical switch matrix. In the second embodiment, the plurality of splitter/combiners comprises a second set of splitters/combiners having their uncommon ports connected to respective ones of the C ports of the optical switch matrix and having their common ports connected to respective ones of the D ports of the optical switch matrix.

In one example of the second embodiment, $N_i > N_o$ such that each input device is coupled to a respective one of the C ports of the optical switch matrix, and each output device is coupled to a respective one of the D ports of the optical switch matrix. Alternatively, $N_i < N_o$ such that each input device is coupled to a respective one of the D ports of the optical switch matrix, and each output device is coupled to a respective one of the C ports of the optical switch matrix.

In the second embodiment, the first set of splitters/combiners may be defined as follows: (a) A is defined as $\max(N_i, N_o)$ and B is defined as $\min(N_i, N_o)$; (b) for i=1, 2, ..., the splitter/combiner in the first set of splitters/combiners is an $X_i$:1 splitter/combiner, where $X_i = A/i$ rounded down to the nearest integer; and (c) if $X_i < 2$, the $i^{th}$ splitter/combiner is excluded from the first set of splitters/combiners and the number of splitters/combiners in the first set of splitters/combiners is S. If desired, each $X_i$ may be constrained by $X_i \leq P$, where P is a predetermined maximum number of RF/analogue signals for the first set of splitters/combiners to fan-in or fan-out, where $P \leq A$.

In the second embodiment, the second set of splitters/combiners may be defined as follows: (a) for i=1, 2, ..., the $i^{th}$ splitter/combiner in the second set of splitters/combiners is an $Y_i$:1 splitter/combiner, where $Y_i = B/i$ rounded down to the nearest integer; and (b) if $Y_i < 2$, the $i^{th}$ splitter/combiner is excluded from the second set of splitters/combiners and the number of splitters/combiners in the second set of splitters/combiners is T. If desired, each $Y_i$ may be constrained by $Y_i \leq Q$, where Q is a predetermined maximum number of RF/analogue signals for the second set of splitters/combiners to fan-in or fan-out, where $Q \leq B$.

In the second embodiment, the numbers C and D of ports required may be given by: $C = A + S + \sum_{i=1}^{T} Y_i$ and $D = B + T + \sum_{i=1}^{S} X_i$ Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

For applications that require more than just point-to-point connections, where fan-in (combining) or fan-out (splitting) distribution is desired, optical solutions can support these requirements. In particular, RF over fibre can be used to multiplex many channels on a single fibre for high density, small footprint distribution using wavelength division multiplexing (WDM).

Figure 1:
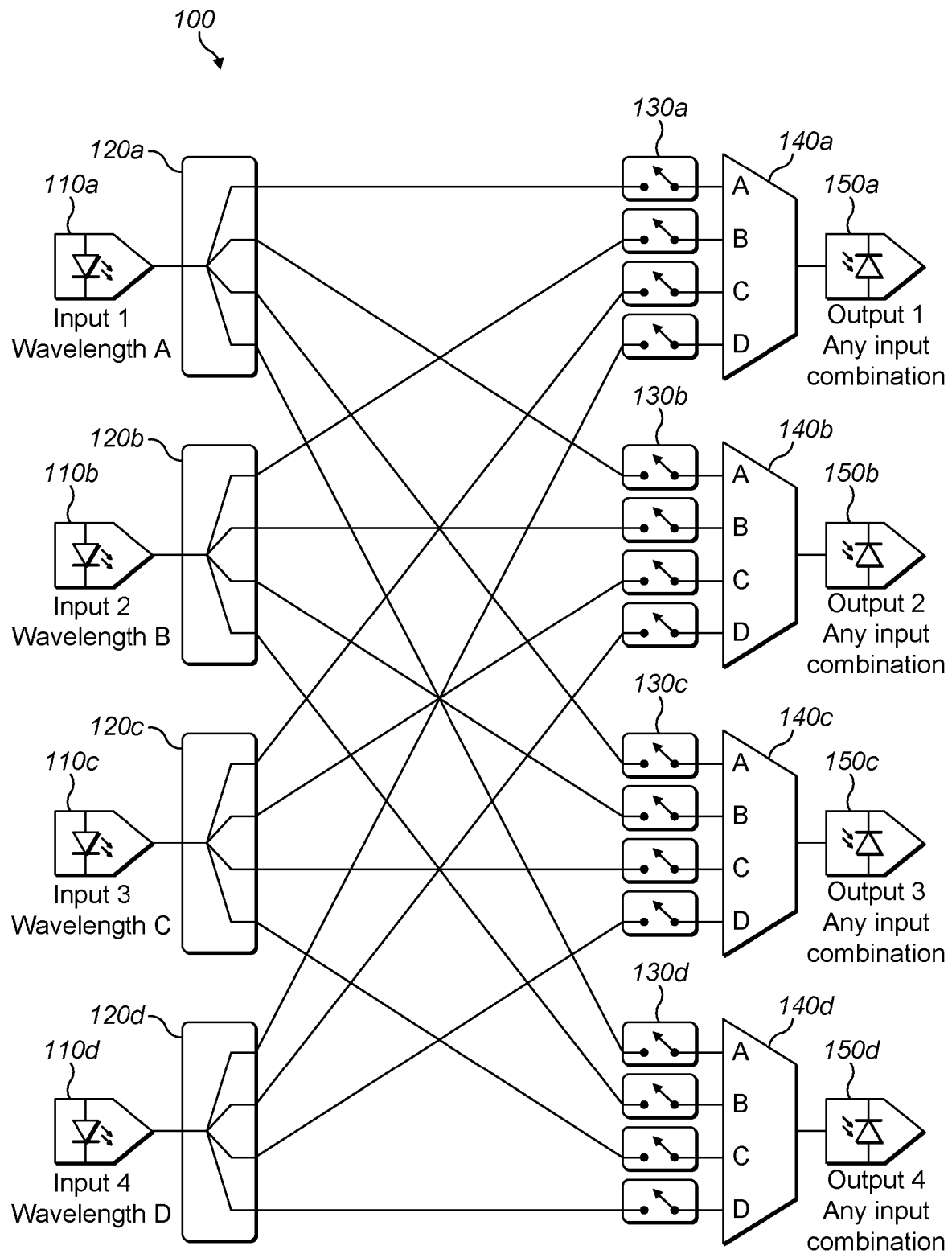
FIG. 1 schematically illustrates an exemplary system for routing RF over fibre signals.

A known system 100 for routing RF over fibre signals is shown in FIG. 1. RF over fibre refers to analogue over fibre, as opposed to digital over fibre. As mentioned in the Background section, the analogue (e.g. RF) data signal is used to modulate an optical (e.g. laser) carrier signal. In many applications, the analogue data signal is a radio frequency signal (hence the terminology 'RF over fibre'), but a lower frequency analogue data signal (e.g. a 20 Hz audio signal) or a DC data signal (having high and low states) could also be used to modulate the optical carrier signal. Thus, in this application, the term 'RF over fibre' encompasses an analogue data signal (DC up to 300 GHz) being modulated onto an optical carrier signal and transmitted via an optic fibre; the data signals are described herein as RF/analogue signals. FIG. 1 shows four RF over fibre inputs 110a-d on the left hand side, each of which provides an input signal having a different wavelength (A-D). Each of these four RF over fibre input signals is split by a respective splitter 120a-d into four separate signals. The system 100 further includes four switch arrays 130a-d. Each switch array 130 feeds into a respective combiner 140a-d. Each combiner 140 is associated with a respective RF over fibre output 150a-d.

The four signals output by each splitter 120 are fed into four switches, one from each of the four switch arrays 130. For example, the split signals output by the first splitter 120a feed into (a) a first switch of the first switch array 130a, (b) a first switch of the second switch array 130b, (c) a first switch of the third switch array 130c, and (d) a first switch from the fourth switch array 130d. Thus, each switch array 130 receives one input signal from each of the four splitters 120. In other words, each of the receivers receives a version of each input signal, regardless of the fact that they may only be interested in a single input signal. Depending on which input signals are selected using the switches of the switch arrays 130, the combiners 140 each act to combine the selected input signals to provide an output signal to the respective output 150. Thus, each switch array 130 and associated combiner 140 may be considered as a tunable filtering element. For example, the first switch array 130a may be used to select the first input signal only such that the output from the first combiner 140a is based on the first input signal only. The second switch array 130b may be used to select the second and third input signals only such that the output from the second combiner 140b is based on a combination of the second and third input signals. The third switch array 130c may be used to select the first and third input signals only such that the output from the third combiner 140c is based on a combination of the first and third input signals. The fourth switch array 130d may be used to select all of the input signals such that the output from the fourth combiner 140b is based on a combination of all of the input signals.

Using the known system of FIG. 1, any input 110 can be routed to any output 150, with signal combination as necessary. However, if more than four inputs are required, the required number of components and the complexity of the system both increase substantially. Furthermore, as the number of inputs increases from the four shown in FIG. 1 to an arbitrary large number N, it will be appreciated that the splitting losses also increase since each input signal is split into N separate signals, with a consequent reduction in amplitude. In this case, optical amplification is likely to be required, which adds significant complexity in terms of the implementation. Furthermore, the architecture of FIG. 1 is unidirectional. Therefore, the system of FIG. 1 is in many ways not practical when considering a larger number of inputs and outputs. Nonetheless, from this starting point, it is desired to design a completely reconfigurable signal distribution/routing array where numerous input devices require reconfigurable access to multiple output devices, without the disadvantages described with reference to FIG. 1.

6×4 Reconfigurable Array Using any-to-Any Optical Switch Matrix

Figure 2A:
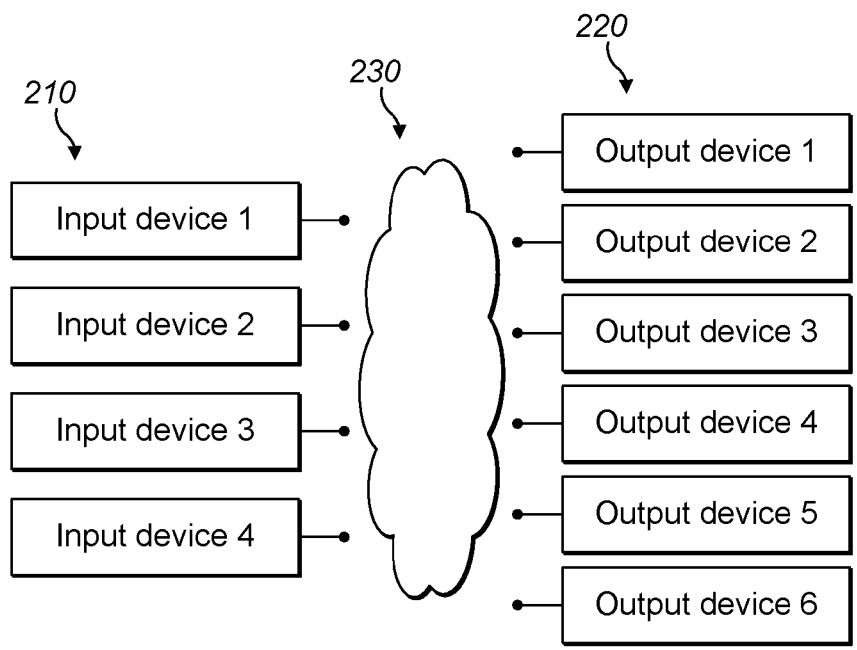
FIG. 2a schematically illustrates a reconfigurable array for facilitating dynamic combination and distribution of RF/analogue signals between four input devices and six output devices.

A signal distribution/routing array where numerous input devices require reconfigurable access to multiple output devices is schematically illustrated in FIG. 2a. The example of FIG. 2a includes four input devices 210 and six output devices 220 with a reconfigurable distribution/routing arrangement 230 between them. Equally, the system of FIG. 2a could be used in reverse such that there are six input devices and four output devices. Of course, it will be appreciated that any number of input and output devices may be present depending on the desired use case. In general, the input devices generate or supply RF/analogue signals, so could be RF/analogue source devices such as receiving antennas, SDR transmitters (TX), or other RF/analogue signal generators. The output devices analyse or forward RF/analogue signals, so could be RF/analogue sink devices such as transmitting antennas, SDR receivers (RX), or other RF/analogue signal analysers (e.g. test devices).

Figure 2B:
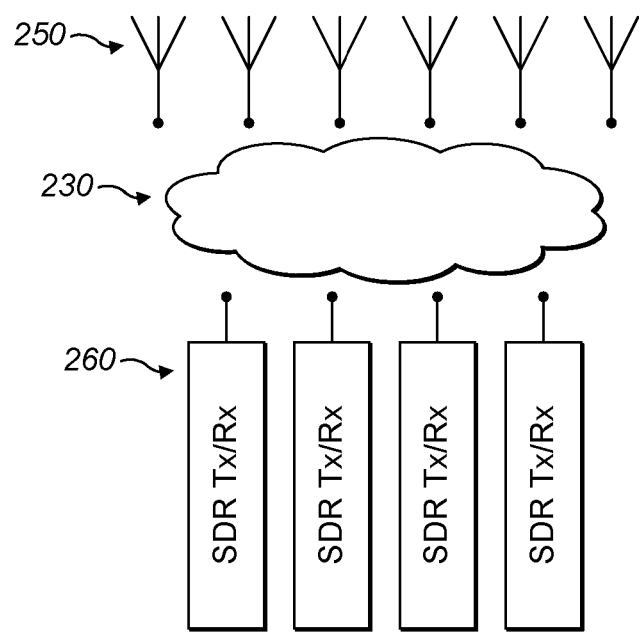
FIG. 2b schematically illustrates a specific example of the reconfigurable array of FIG. 2a where the input devices are antennas and the output devices are Software Defined Radios (SDRs)

As a specific example, FIG. 2b shows the input and output devices as six antennas 250 and four SDRs 260. Each antenna 250 in FIG. 2 can be either an input device 210 (i.e. a receiving antenna) or an output device 220 (i.e. a transmitting antenna). In addition, each SDR 260 in FIG. 2 can be either an input device 210 (i.e. an SDR TX which generates RF/analogue signals) or an output device 220 (i.e. an SDR RX which analyses RF/analogue signals). Furthermore, single or many connections to an SDR 260 or antenna 250 may be necessary to meet the following requirements:

(a) One SDR TX connected to many antennas is required in the case of a distributed antenna which is able to transmit in multiple directions. Equally, this arrangement is useful where high frequency directionality of transmission is required. In this example, the SDR TX in an input device 210, and the antennas are output devices 220.

(b) Many SDR TX connected to one antenna is required for broadband composite signal generation. In this example, the SDR TXs are input devices 210, and the antenna is an output device 220.

(c) One antenna connected to many SDR RX is required for multi-carrier high throughput demodulation. In this example, the antenna is an input device 210, and the SDRs are output devices 220.

(d) Many antenna connected to one SDR RX is useful at low frequencies for efficient SDR usage. In this example, the antennas are input devices 210, and the SDRs are output devices 220.

(e) Antenna to antenna connections are used in repeater stations.

(f) SDR TX to SDR RX connections may be required to use the optics as radio-to-radio over long distance fibres.

Thus, a bidirectional, reconfigurable signal distribution/routing arrangement 230 between the input devices 210 and the output devices 220 is desirable, including options for fan-in and fan-out. Such an arrangement could be used to re-purpose communications infrastructure (e.g. antennas) to inject electronic countermeasure waveforms to block certain communications. This can be done using fan-in functionality to combine the signal-to-be-blocked with an opposing signal which can jam or obliterate the signal-to-be-blocked.

Figure 3:
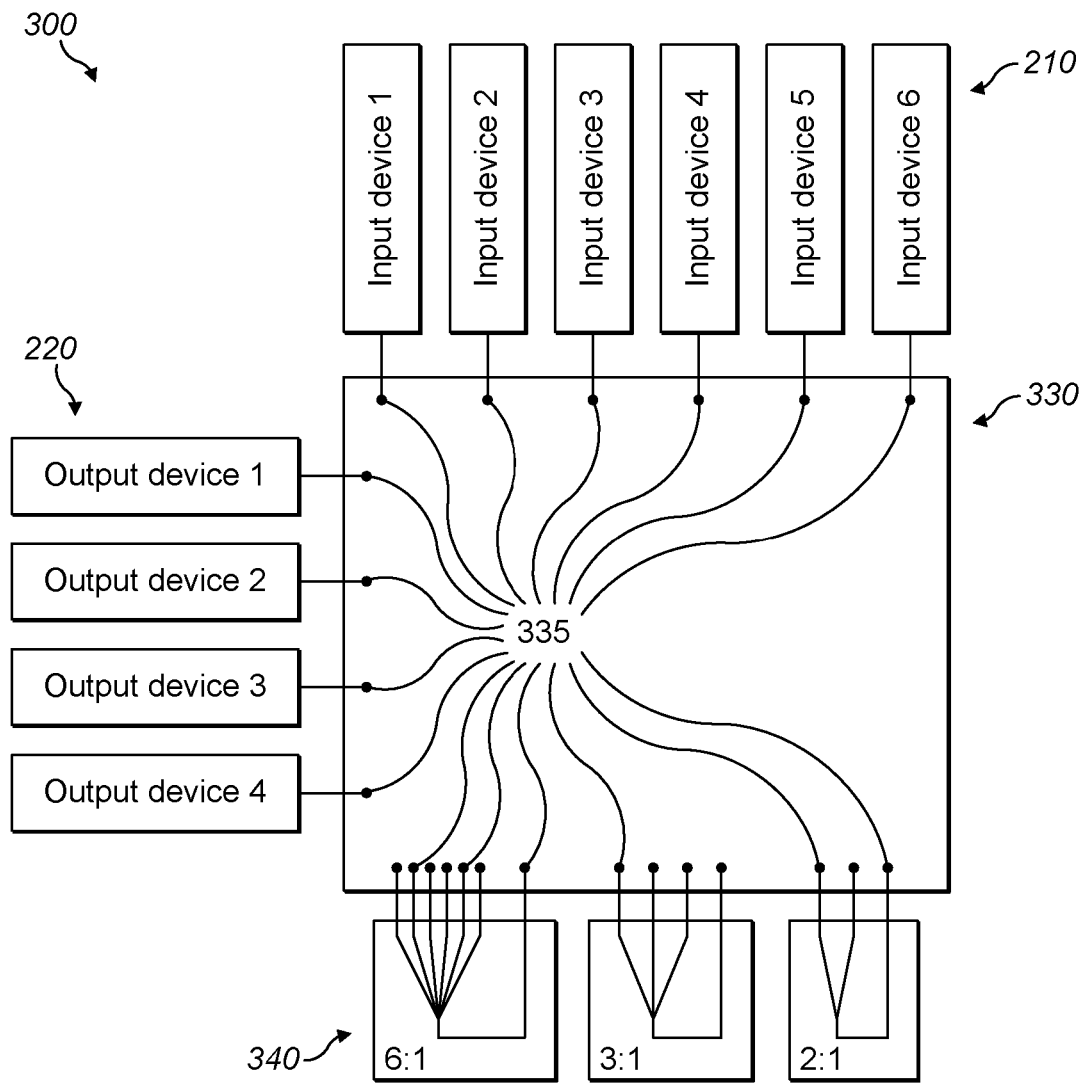
FIG. 3 schematically illustrates a reconfigurable array according to a first embodiment of the present invention including an any-to-any optical switch matrix for routing/distributing optical signals between six input devices and four output devices.

Accordingly, a suitable reconfigurable array 300 for facilitating dynamic combination and distribution of RF/analogue signals is schematically illustrated in FIG. 3. The reconfigurable array 300 comprises input devices 210 for generating or supplying RF/analogue signals, output devices 220 for analysing or forwarding RF/analogue signals, an optical switch matrix 330, and a plurality of splitters/combiners 340 to enable fan-in or fan-out of optical signals. In the exemplary arrangement of FIG. 3, there are six input devices 210 and four output devices 220, but it will be understood that any number of input and output devices could be used depending on the use case.

The optical switch matrix 330 comprises a number of ports 335, the number designated $N_p$. Note that most, but not all of the ports 335 are labelled in FIG. 3. In the arrangement of FIG. 3 there are 24 ports 335 (i.e. $N_p$=24), but it will be appreciated that this is exemplary such that a different number of ports 335 may be provided depending on the implementation requirements in a particular case. In the example of FIG. 3, the optical switch matrix 330 is a so-called "any-to-any" optical switch matrix that is fully configurable to enable optical connection of any one of the ports 335 to any other one of the ports 335. Each of the ports 335 acts as an optical input to or an optical output from the optical switch matrix 330. Furthermore, each of the ports 335 of the any-to-any optical switch matrix 330 is reconfigurable from being an optical input to an optical output (or vice versa), and may switch seamlessly between the two. Thus, the optical switch matrix 330 is reconfigurable, fully bidirectional, and has low loss and high isolation. The optical switch matrix 330 is also non-blocking in that no optical connections block other optical connections therethrough. An exemplary any-to-any optical switch matrix with 48 ports is the Polatis Series 6000 48×CC OSM available from Huber+Suhner (see https://www.polatis.com/switch-modules-for-oem-all-optical-switch-module-solutions-original-equipment-manufactures.asp.).

The number of input devices 210 is designated $N_i$. In the arrangement of FIG. 3 there are six input devices 210 (i.e. $N_i$=6), but it will be appreciated that this is exemplary such that a different number of input devices 210 may be provided. Each input device 210 is coupled to a respective port 335 of the optical switch matrix 330 at an optical input.

The number of output devices 220 is designated $N_o$. In the arrangement of FIG. 3 there are four output devices 220 (i.e. $N_o$=4), but it will be appreciated that this is exemplary such that a different number of output devices may be provided. Each output device 220 is coupled to a respective port 335 of the optical switch matrix 330 at an optical output.

The splitters/combiners 340 are used to address requirements (a)-(f) listed above. The splitters/combiners 340 are reconfigurable and bidirectional. Thus, each splitter/combiner 340 has multiple uncommon ports which couple to a single common port. Each splitter/combiner 340 enables either fan-in of optical signals from the uncommon ports to the common port, or fan-out of optical signals from the common port to the uncommon ports, depending on the direction in which the splitter/combiner 340 is connected. in particular, when connected in one direction, a splitter/combiner 340 acts as a combiner where inputs to the uncommon ports are fanned-in to the common port (i.e. there is a many-to-one configuration of splitter/combiner inputs to splitter/combiner outputs). When connected in the opposite direction, a splitter/combiner 340 acts as a splitter where an input to the common port is fanned-out to the uncommon ports (i.e. there is a one-to-many configuration of splitter/combiner inputs to splitter/combiner outputs). Each port (common/uncommon) of each splitter/combiner 340 is coupled to a respective port 335 of the optical switch matrix 330. The plurality of splitters/combiners include at least one M:1 splitter/combiner, where M is a predetermined maximum number of RF/analogue signals for the reconfigurable array to fan-in or fan-out, where $M \leq N_i$ and $M \leq N_o$. In the example of FIG. 3, M=6. Thus, the 6:1 splitter/combiner may be used to fan-in all of the signals from the six input devices 210. Equally, the 6:1 splitter/combiner may be used to fan-out a single input signal to all of the four output devices 220. The plurality of splitters/combiners 340 in the reconfigurable array 300 of FIG. 3 further include a 3:1 splitter/combiner and a 2:1 splitter/combiner 340.

Notably, each port 335 of the optical switch matrix 330 is configured to connect to a single optical input or output. Thus, if an optical switch matrix port 335 is coupled to an input device 210, it cannot also be coupled to an output device 220 or to a common/uncommon port of a splitter/combiner 340 or even to another input device 210.

Regarding inputs into the optical switch matrix 330, each input signal should be an optical input signal. Thus, an RF/analogue input signal from an input device 210 is converted to an optical signal prior to its presentation at a port 335 of the optical switch matrix 330. Equally, outputs from the optical switch matrix 330 will all be optical output signals. Thus, it is also necessary to convert such output signals back to RF/analogue for onward transmission or processing by the output devices 220. For this reason, each input device 210 may be coupled to its respective port 335 of the optical switch matrix 330 by means of a respective electrical-to-optical (E/O) converter (not shown). Each E/O converter is configured to convert an incoming RF/analogue signal into a corresponding optical signal for distribution/routing through the optical switch matrix 330. As is known, this may be achieved by modulating a light source intensity with the RF/analogue signal to generate a corresponding optical signal. In addition, each output device is coupled to the respective port of the optical switch matrix 330 by means of a respective optical-to-electrical (O/E) converter (not shown). Each O/E converter is configured to convert an optical signal from the optical switch matrix 330 into an RF/analogue signal for analysis or onward transmission by the relevant output device 220. As is also known, this may be achieved by demodulation of the optical signal. If an input device 210 or output device 220 is remote from the optical switch matrix 330, an optical fibre (of up to several kilometres in length) may extend between the relevant E/O or O/E converter and the associated port 335 of the optical switch matrix 330.

When generating optical inputs into the optical switch matrix 330, it is important that any optical inputs destined to be combined by one of the splitters/combiners 340 have different wavelengths assigned to enable wavelength-division multiplexing (WDM). This can be achieved if the E/O converters for each of the input devices 210 are configured to generate optical signals having different optical wavelengths (or wavelength bands) to one another. Of course, if signals from one or more of the input devices 210 are never required to be combined with signals from any of the other input devices 210, it will be understood that those input devices 210 need not have distinct wavelengths (or wavelength bands) associated with them. Note that the use of an optical switch matrix 330 enables fan-in of signals in a highly linear manner for frequency stacking each of the generated optical signals, and this is clearly advantageous.

Each of the O/E converters includes an optical receiver configured to receive an optical signal from the optical switch matrix 330 for subsequent conversion into an RF/analogue signal for onward transmission to the relevant output device 220. Notably, optical receivers are by their nature wideband and will respond to any wavelengths present.

In cases where optical signals are split by one or more of the splitters/combiners 340 as they pass through the optical switch matrix 330, there will be a consequent reduction in amplitude of the optical signal. In addition, the optical loss of the splitters/combiners 340 can be different (e.g. there will generally be a greater optical loss when using a 6:1 splitter/combiner as compared to using a 2:1 splitter/combiner). Thus, the O/E converters may also be configured to provide automatic gain control to compensate for this. In this case, each O/E converter includes a respective RF/analogue amplifier, and the automatic gain control may be achieved by controlling the RF/analogue amplifier based on a measured light level of the received optical signal so as to adjust an RF/analogue output power to a predetermined level. In this way, the different optical paths can be gain balanced if deemed necessary.

FIG. 3 shows the optimal unconstrained arrangement of splitters/combiners 340 for the 6×4 example (which has six input devices 210 and four output devices 220). With this arrangement, all requirements can be met without restriction/constraint on fan-in or fan-out. In other words, the unconstrained example of FIG. 3 enables fan-in of all six input devices 210 or fan-in of any subgroups of input devices 210. Similarly, the unconstrained example of FIG. 3 enables fan-out to all four output devices 220 or fan-out to any subgroups of output devices 220. The full configuration options are set out in Table 1 below:

TABLE 1

| No. of input devices: 6<br>No. of output devices: 4<br>Total no. of S/C ports: 14<br>Total no. of ports: 24 | | | | Unconstrained<br>(i.e. M = 6) | | |
|---|---|---|---|---|---|---|
| S/C:<br>No. of S/C uncommon ports:<br>Total no. of S/C ports: | 6:1<br>6<br>7 | 3:1<br>3<br>4 | 2:1<br>2<br>3 | Direct output<br>connections/connections<br>to common S/C ports | | |
| A | 6 | | | | | |
| B | 5 | | | 1 | | |
| C | 4 | 2 | | | | |
| D | 4 | | | 1 | 1 | |
| E | 3 | 3 | | | | |
| F | 3 | 2 | | 1 | | |
| G | 3 | | | 1 | 1 | 1 |
| H | 2 | 2 | 2 | | | |
| I | 2 | 2 | | 1 | 1 | |
| J | 2 | | | 1 | 1 | 1 |

In Table 1, S/C is shorthand for "splitter/combiner". The number of uncommon ports for each splitter/combiner 340 is shown, as well as the total number of optical switch matrix ports 335 that are required for each splitter/combiner 340. In each case, the number of optical switch matrix ports 335 required for each splitter/combiner 340 is equal to the number of uncommon ports plus one (for the common port). This is clearly depicted for the splitters/combiners 340 in FIG. 3 (e.g. the 6:1 splitter/combiner 340 is connected to 7 ports 335 of the optical switch matrix 330). Note that, for each configuration, there are only entries in four columns at most, since, in this example, there are only four output devices 220 to which the input devices may ultimately be connected.

Configurations A-J in Table 1 depict all possible required configurations for fan-in of the six input devices 210. For example, configuration A involves all six input devices 210 being connected to a single output device 220 by means of the 6:1 splitter/combiner 340. If the input devices 210 were antennas and the single output device 220 was an SDR, this arrangement could be used for requirement (d) listed above. If the input devices 210 were SDRs and the single output device 220 was an antenna, this arrangement could be used for requirement (b) listed above. It is clear that any one-to-one mapping of any input device 210 to any output device 220 is possible, bypassing all splitters/combiners 340. This is used to some extent in all of configurations B, D, F, G, I and J. For example, configuration D connects four of the input devices 210 to one output device 220 by means of the 6:1 splitter/combiner 340, with the other two input devices 210 being directly connected to respective output devices 220 without the need for splitting/combining. Configuration E involves connecting three input devices 210 to one output device 220 by means of the 6:1 splitter/combiner 340, and connecting the other three input devices 210 to another output device 220 by means of the 3:1 splitter/combiner 340. The 2:1 splitter/combiner 340 is only required for configuration H where the input ports 335 are separated into three pairs. Nonetheless, it will be appreciated that the 2:1 splitter/combiner 340 could be used instead of the 3:1 splitter/combiner 340 in configurations C, F, I and J. Equally, the 3:1 splitter/combiner 340 could be used instead of the 6:1 splitter/combiner 340 in configurations F, G and I. This may be desirable to reduce splitting losses. Notably, one of the input devices 210 is not used in configuration J, so this is an unlikely scenario in the 6×4 example.

Figure 4:
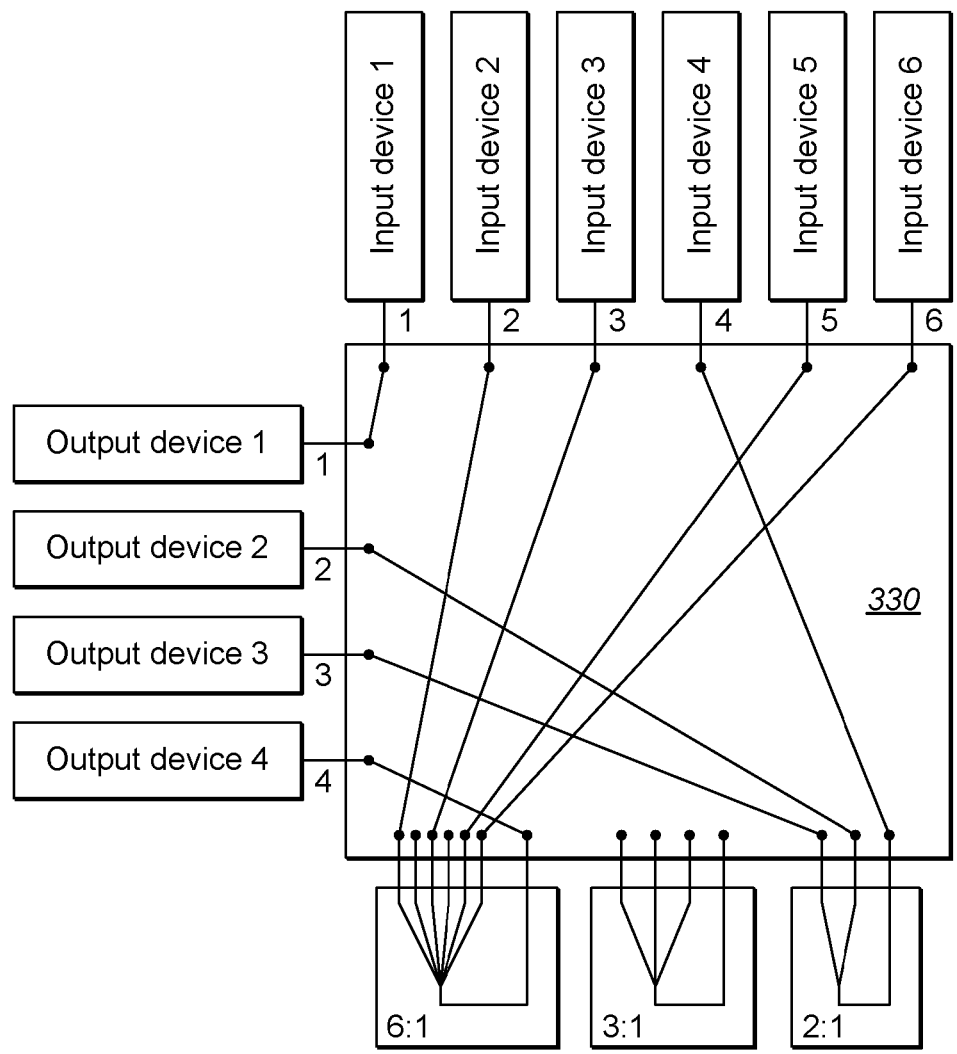
FIG. 4 schematically illustrates an exemplary configuration of the reconfigurable array of FIG. 3.

An example of the configurability of the reconfigurable array 300 to meet the different distribution requirements is shown in FIG. 4. In this example, the 3:1 splitter/combiner is not used. Input device 1 is directly connected to output device 1 without passing through a splitter/combiner. In addition, input devices 2, 3, 5 and 6 are all connected to uncommon ports of the 6:1 splitter/combiner for onward connection to output device 4. Also, input device 4 is connected to the common port of the 2:1 splitter/combiner for onward connection to output devices 2 and 3. This corresponds to configuration D in Table 1. Importantly, if the distribution requirements change, then the optical switch matrix 330 may be reconfigured to provide different connections as desired.

Figure 5:
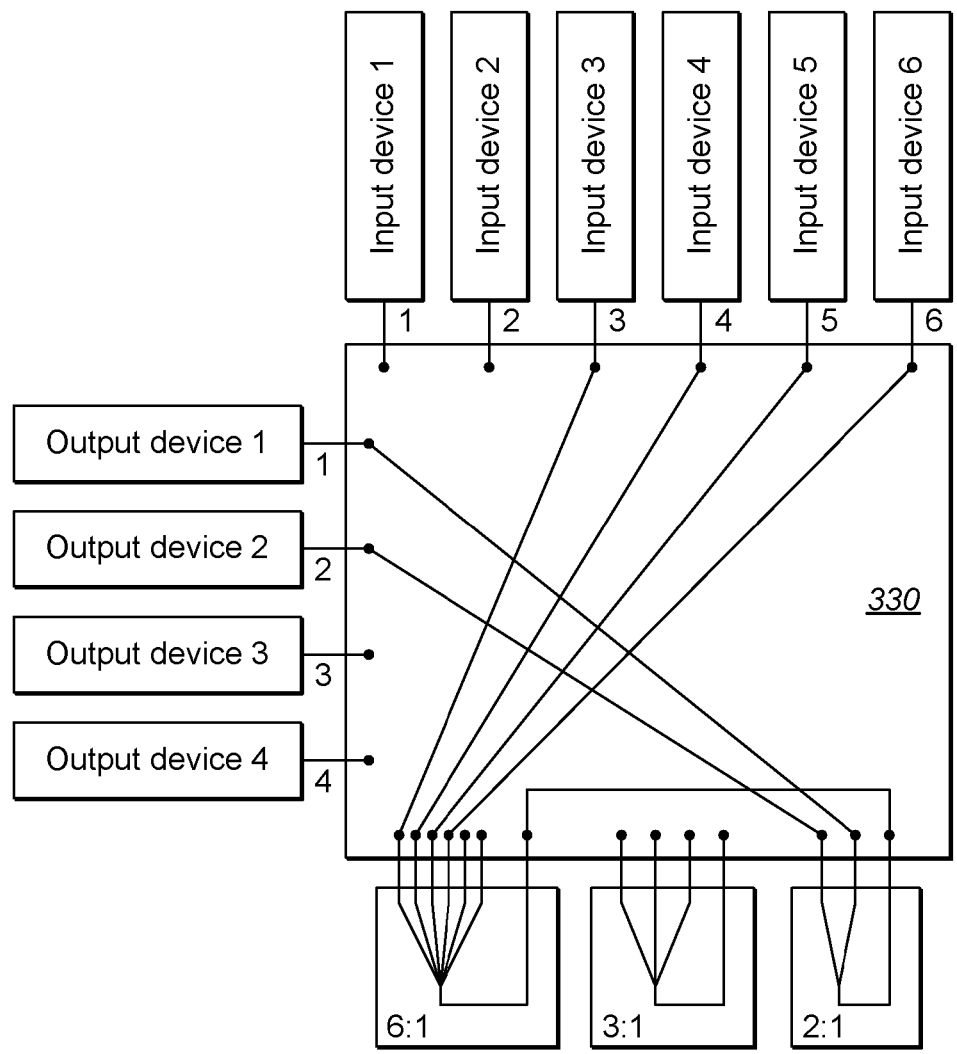
FIG. 5 schematically illustrates another exemplary configuration of the reconfigurable array of FIG. 3.

A further example of the configurability of the reconfigurable array 300 to meet the different distribution requirements is shown in FIG. 5. In this example, input devices 3, 4, 5, and 6 are connected to four of the six uncommon ports of the 6:1 splitter/combiner so as to combine the four signals. The common ports of the 6:1 and 2:1 splitters/combiners are then connected such that the combined signal is split into two to provide output signals to output devices 1 and 2. Again, the 3:1 splitter/combiner is not used in this example.

Whilst a 6×4 example of the reconfigurable array 300 is described above, it will be understood that the reconfigurable array 300 may be expanded to account for larger distribution requirements. As the size of the system increases (in terms of the numbers $N_i$, $N_o$ of input and output devices 210, 220), it may not be feasible to support an unconstrained system due to the number of splitters/combiners 340 required, and the consequent size of the optical switch matrix 330. Constraining the array in terms of fan-in/fan-out requirements can significantly reduce the optical switch matrix size (i.e. $N_p$) by altering or dropping some of the splitter/combiner options. Furthermore, a typical deployment will not generally require unconstrained flexibility as not all input and output devices 210, 220 will be the same and there is often a known set of input and output devices 210, 220 that require support for fan-in/fan-out, and this can be designed into the reconfigurable array 300.

An example of a constrained 6×4 reconfigurable array 300 is shown in Table 2 where the predetermined maximum number of RF/analogue signals for the reconfigurable array to fan-in or fan-out is M=4. As can be seen, this means that a 4:1 splitter/combiner may be used in place of the 6:1 splitter/combiner 340 of FIG. 3, which reduces the total number $N_p$ of required ports 335 from 24 to 22. This is a relatively small saving in terms of the number $N_p$ of ports 335, but the savings can be very significant when constraining a larger reconfigurable array 300.

TABLE 2

| No. of input devices: 6 | | | | Constrained | |
| No. of output devices: 4 | | | | (M = 4) | |
| Total no. of S/C ports: 12 | | | | | |
| Total no. of ports: 22 | | | | | |

| S/C: | 4:1 | 3:1 | 2:1 | Direct output | |
|---|---|---|---|---|---|
| No. of S/C uncommon ports: | 4 | 3 | 2 | connections/connections | |
| Total no. of S/C ports: | 5 | 4 | 3 | to common S/C ports | |
| A | 4 | 2 | | | |
| B | 4 | | | 1 | 1 |
| C | 3 | 3 | | | |
| D | 3 | 2 | | 1 | |
| E | 3 | | | 1 | 1 | 1 |
| F | 2 | 2 | 2 | | |
| G | 2 | 2 | | 1 | 1 |
| H | 2 | | | 1 | 1 | 1 |

The described reconfigurable array 300 could be used in many communications applications, such as the distribution requirements (a)-(f) listed above.

Generalised Reconfigurable Array Using any-to-Any Optical Switch Matrix

For a general $N_i \times N_o$ unconstrained reconfigurable array 300, it is possible to calculate the splitter/combiner requirements as follows:
  Define A=max($N_i$, $N_o$)
  Define B=min($N_i$, $N_o$)
  For i=1, 2, . . . , the $i^{th}$ splitter/combiner is an $X_i$:1 splitter/combiner, where $X_i$=A/i rounded down to the nearest integer
  Note that if $X_i$<2, the $i^{th}$ splitter/combiner is not required and should be omitted, such that the full set of splitters/combiners has already been determined, with the total number of splitters/combiners being designated S.
The total number of ports required is given by:

$$p = N_i + N_o + \sum_{i=1}^{S}(X_i + 1)$$

Then, consider constraining the $N_i \times N_o$ reconfigurable array 300 such that there is a predetermined maximum number (M) of RF/analogue signals for the reconfigurable array to fan-in or fan-out. In this case, the unconstrained splitter/combiner requirements (as calculated above) should be modified as follows:

Constrain each $X_i$ as follows: $X_i \leq M$

In each case (constrained/unconstrained), note that the system is symmetric. In other words, the same splitter/combiner requirements and the same number of optical switch matrix ports occur regardless of whether you have, e.g., 10 input devices and 72 output devices, or 72 input devices and 10 output devices.

Consider an exemplary reconfigurable array 300 having $N_i=16$ and $N_o=6$ (i.e. A=16 and B=6). In this case, the splitters/combiners 340 required to provide an unconstrained system (M=16) would be as follows: 16:1, 8:1, 5:1, 4:1, 3:1, 2:1. Thus, the total number $N_p$ of ports 335 required for the optical switch matrix 330 would be 66. If the 16×6 (or 6×16) reconfigurable array 300 were constrained such that the predetermined maximum number of RF/analogue signals for the reconfigurable array to fan-in or fan-out is M=6, the splitters/combiners 340 required would be as follows: 6:1, 6:1, 5:1, 4:1, 3:1, 2:1. This reduces the total number $N_p$ of required ports to 54.

As another example, consider a reconfigurable array 300 having $N_i=32$ and $N_o=6$ (i.e. A=32 and B=6). In this case, the splitters/combiners 340 required to provide an unconstrained system (M=16) would be as follows: 32:1, 16:1, 10:1, 8:1, 6:1, 5:1. Thus, the total number $N_p$ of ports 335 required for the optical switch matrix 330 would be 121. If the 32×6 reconfigurable array 300 were constrained to M=8, the splitters/combiners 340 required would be as follows: 8:1, 8:1, 8:1, 8:1, 6:1, 5:1. this reduces the total number $N_p$ of required ports 335 to 87. If the 32×6 reconfigurable array 300 were further constrained to M=6, the splitters/combiners 340 required would be as follows: 6:1, 6:1, 6:1, 6:1, 6:1, 5:1. This further reduces the total number $N_p$ of required ports 335 to 79.

The M-constrained system described above is just one example of the sort of constraint that may be applied to the reconfigurable array 300 when deciding which splitter/combiners 340 should be included. Other types of constraint are possible to meet system requirements. For example, a 16×6 system could be constrained to provide fan-in for up to 8 input devices 210, with the remaining input devices 210 only requiring a maximum of 4 to be fanned-in. This would require the following splitters/combiners: 8:1, 4:1, 4:1, 4:1, 3:1, 2:1. Thus, it will be appreciated that the system is fully configurable to provide any required signal routing/distribution requirements with the minimum number of optical components and optical ports. Given size, weight and power constraints, an array of optical components can be added to the optical switch matrix 330 to provide the functionality required.

Any-to-any optical switch matrices are available to buy with a number of ports that is a multiple of 16 (i.e. $N_p=16n$, where n is an integer). This is because the switches tend to be built in slices of 16 ports per slice. Thus, in cases where the constrained or unconstrained system has spare optical ports 335, additional splitters/combiners 340 may be included for redundancy purposes in order to cope with any component failures or to maximise availability. For example, in the unconstrained 6×4 example of FIG. 3, if it were not possible to obtain a 24-port optical switch matrix 330, then a 2-slice, 32-port optical switch matrix 330 could be used, leaving 8 spare ports. These could be used to provide an additional (redundant) 6:1 splitter/combiner, or additional (redundant) 3:1 and 2:1 splitters/combiners, as desired. An important aspect of constraining the signal routing/distribution requirements is to reduce the number of ports required since costs go up considerably with each additional slice added to the optical switch matrix.

6×4 Reconfigurable Array Using C×D Optical Switch Matrix

Whilst the optical switch matrix described above was an any-to-any optical switch matrix 330, this is not an essential feature. Alternative embodiments are envisaged using a C×D optical switch matrix 630, as described below with reference to FIG. 6. A C×D optical switch matrix comprises a number (C) of ports on one side and a number (D) of ports on the other side, where we will assume $C \leq D$. C×D optical switch matrix matrices are bidirectional, so that a C×D optical switch matrix may be operated with the C ports as input ports and the D ports as output ports, or the other way around with the C ports as output ports and the D ports as input ports. A C×D optical switch matrix 630 is configurable to enable optical connection of any of the C ports on the one side to any of the D ports on the other side. Thus, any optical input may be connected to any optical output. Such optical switch matrices allow simultaneous connection between optical inputs and outputs in a fully non-blocking, all-optical, cross-connect configuration. Exemplary C×D optical switch matrices are the MEMS Matrix Optical Switches available from DiCon Fiberoptics, Inc. (see https://www.diconfiberoptics.com/products/mems_matrix_optical_switches.php). Features of the C×D optical switch matrix embodiment described below should be considered to be similar to those of the any-to-any optical switch matrix embodiments described above, except where described differently below.

Figure 6:
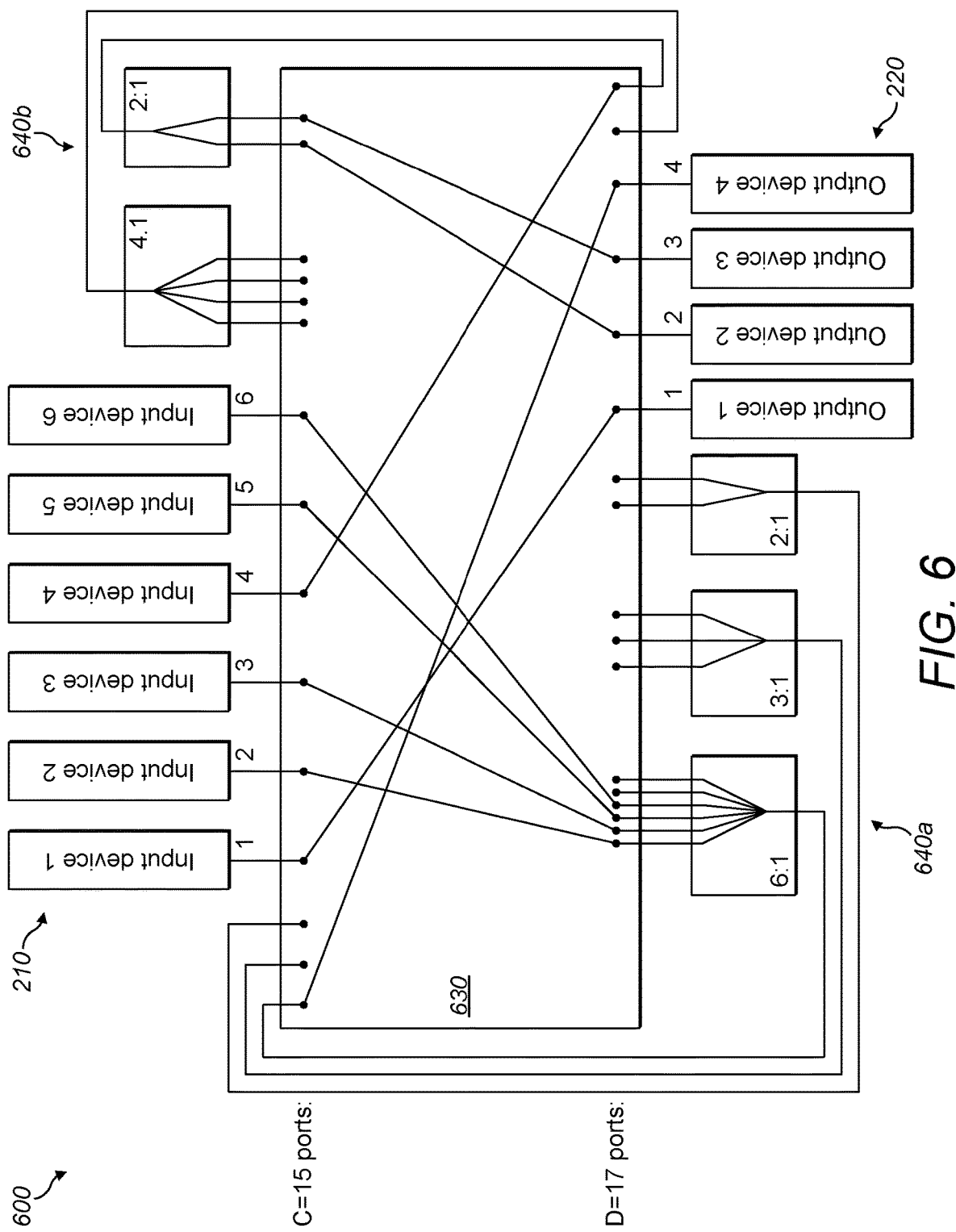
FIG. 6 schematically illustrates a reconfigurable array according to a second embodiment of the present invention including a C×D optical switch matrix for routing/distributing optical signals between six input devices and four output devices.

The reconfigurable array 600 of FIG. 6 comprises input devices 210, output devices 220, a C×D optical switch matrix 630, and a plurality of splitters/combiners 640 to enable fan-in or fan-out of optical signals. To enable a direct comparison to FIG. 3, there are six input devices 210 (i.e. $N_i=6$) and four output devices 220 (i.e. $N_o=4$) shown in FIG. 6. In particular, FIG. 6 shows the same 6×4 connection configuration as is shown in FIG. 4, but using the C×D optical switch matrix 630 rather than the any-to-any optical switch matrix 330. However, it will be understood that any number of input and output devices could be used depending on the use case.

In the arrangement of FIG. 6, $N_i > N_o$. Since we have assumed that $C \leq D$ by definition), each input device 210 is coupled to a respective one of the C ports of the optical switch matrix 630, and each output device 220 is coupled to a respective one of the D ports of the optical switch matrix 630. Thus, the C ports are input ports and the D ports are output ports. If $N_i < N_o$, then the C ports would be output ports and the D ports would be input ports. In other words, the input/output devices that are greater in number should be connected to the side of the optical switch matrix 630 with fewer ports (i.e. the side having C ports).

In FIG. 6, there are 15 input ports shown at the top of the optical switch matrix 630 (i.e. C=15), and there are 17 output ports shown at the bottom of the optical switch matrix 630 (i.e. D=17). Thus, the C×D optical switch matrix 630 in this example is a 15×17 optical switch matrix. Of course, it will be appreciated that this is exemplary such that different numbers of input and output ports may be provided depending on the implementation requirements in a particular case.

The plurality of splitters/combiners 640 comprise two sets of splitters/combiners. A first set 640a of splitters/combiners has their uncommon ports connected to respective ones of the D ports of the optical switch matrix 630 and has their common ports connected to respective ones of the C ports of the optical switch matrix 630. Thus, since the input devices 210 are connected on the opposite side of the optical switch matrix 630 to the uncommon ports of the first set 640*a* of splitters/combiners (which enables the input devices 210 to be connected to these uncommon ports), each of the first set 640*a* of splitters/combiners enables fan-in of optical signals. A second set 640*b* of splitters/combiners has their uncommon ports connected to respective ones of the C ports of the optical switch matrix 630 and has their common ports connected to respective ones of the D ports of the optical switch matrix 630. Thus, since the input devices 220 are connected on the opposite side of the optical switch matrix 630 to the common ports of the second set 640*b* of splitters/combiners (which enables the input devices 220 to be connected to these common ports), each of the second set 640*b* of splitters/combiners enables fan-out of optical signals. Note that if $N_i < N_o$, then the input and output devices would be the other way around such that each of the first set 640*a* of splitters/combiners enables fan-out of optical signals, and each of the second set 640*b* of splitters/combiners enables fan-in of optical signals.

As for the any-to-any optical switch matrix embodiment, the plurality of splitters/combiners include at least one M:1 splitter/combiner, where M is a predetermined maximum number of RF/analogue signals for the reconfigurable array to fan-in or fan-out, where $M \leq N_i$ and $M \leq N_o$. In the example of FIG. 6, M=6, and the 6:1 splitter/combiner is in the first set 640*b* of splitters/combiners. In fact, the M:1 splitter/combiner is always in the first set 640*a* of splitters/combiners that is opposite the larger number of input/output devices 210, 220 (i.e. the set that has their uncommon ports connected to respective ones of the D ports of the optical switch matrix 630 and has their common ports connected to respective ones of the C ports of the optical switch matrix 630). In FIG. 6, the 6:1 splitter combiner may be used to fan-in all of the signals from the six input devices 210. The first set 640*a* of splitters/combiners in the reconfigurable array 600 of FIG. 6 further includes a 3:1 splitter/combiner and a 2:1 splitter/combiner. Thus, the first set 640*a* of splitters/combiners is identical to the plurality of splitters/combiners 330 used in the any-to-any optical switch matrix embodiment of FIG. 3.

In this C×D optical switch matrix embodiment, the plurality of splitters/combiner 640 further comprise additional splitters/combiners from those used in the any-to-any optical switch matrix embodiment of FIG. 3. In particular, the second set 640*b* of splitters/combiners in FIG. 6 are additional to those used in FIG. 3. This (additional) second set 640*b* of splitters/combiners includes an L:1 splitter/combiner, where $L=\min(N_i, N_o)=B$ in the unconstrained case. In the example of FIG. 6, L=4 such that the second set 640*b* of splitters/combiners comprises a 4:1 splitter/combiner. The second set 640*b* of splitters/combiners in the reconfigurable array 600 of FIG. 6 further includes a 2:1 splitter/combiner.

As for FIG. 3, FIG. 6 shows the optimal unconstrained arrangement of splitters/combiners 340 for the 6×4 example. With this arrangement, all requirements can be met without restriction/constraint on fan-in or fan-out. In other words, the unconstrained example of FIG. 6 enables fan-in of all six input devices 210 or fan-in of any subgroups of input devices 210. Similarly, the unconstrained example of FIG. 6 enables fan-out to all four output devices 220 or fan-out to any subgroups of output devices 220.

Generalised Reconfigurable Array Using C×D Optical Switch Matrix

For a general $N_i \times N_o$ unconstrained reconfigurable array 300, it is possible to calculate the splitter/combiner requirements for the C×D optical switch matrix embodiments as follows.

Let us initially consider the first set 640*a* of splitters/combiners having their common ports connected on the same side of the optical switch matrix 630 as the larger number of input/output devices 210, 220 (i.e. the six input devices 610 in FIG. 6), and having their uncommon ports connected on the same side of the optical switch matrix 630 as the smaller number of input/output devices 210, 220 (i.e. the four output devices 620 in FIG. 6). The first set 640*a* of splitters/combiners in the unconstrained C×D optical switch matrix embodiments are determined in a corresponding manner to the set of splitters/combiners 340 used in the any-to-any optical switch matrix embodiments:

Define $A=\max(N_i, N_o)$

Define $B=\min(N_i, N_o)$

For i=1, 2, . . . , the $i^{th}$ splitter/combiner in the first set is an $X_i$:1 splitter/combiner, where $X_i=A/i$ rounded down to the nearest integer Note that if $X_i < 2$, the $i^{th}$ splitter/combiner is not required and should be omitted, such that the full first set 640*a* of splitters/combiners has already been determined, with the total number of splitters/combiners in the first set 640*a* being designated S.

Let us now consider the second set 640*b* of splitters/combiners having their common ports connected on the same side of the optical switch matrix 630 as the smaller number of input/output devices 210, 220 (i.e. the four output devices 620 in FIG. 6), and having their uncommon ports connected on the same side of the optical switch matrix 630 as the larger number of input/output devices 210, 220 (i.e. the six input devices 620 in FIG. 6). The second set 640*b* of splitters/combiners in the unconstrained C×D optical switch matrix embodiments are determined as follows:

For i=1, 2, . . . , the $i^{th}$ splitter/combiner in the second set is an $Y_i$:1 splitter/combiner, where $Y_i=B/i$ rounded down to the nearest integer Note that if $Y_i < 2$, the $i^{th}$ splitter/combiner is not required and should be omitted, such that the full second set 640*b* of splitters/combiners has already been determined, with the total number of splitters/combiners in the second set 640*b* being designated T.

The numbers C and D of ports required are given by:

$$C = A + S + \sum_{i=1}^{T} Y_i$$

$$D = B + T + \sum_{i=1}^{S} X_i$$

As for the any-to-any optical switch matrix embodiments, it is possible to apply constraints to the C×D optical switch matrix embodiments. Rather than using a single constraint M (as in the any-to-any optical switch matrix embodiments), two constraints are required (one on fan-in and one on fan-out) due to the separate sets 640*a,b* of splitters/combiners used for fan-in and fan-out:

Constrain each $X_i$ as follows: $X_i \leq P$
where P is a predetermined maximum number of RF/analogue signals for the first set 640*a* of splitters/combiners to fan-in or fan-out, where $P \leq A$.
Constrain each $Y_i$ as follows: $Y_i \leq Q$
where Q is a predetermined maximum number of RF/analogue signals for the second set 640*b* of splitters/combiners to fan-in or fan-out, where $Q \leq B$ The C×D optical switch matrix embodiment may be preferable in some cases since C×D optical switch matrices are generally less expensive that any-to-any optical switch matrices.

Although preferred embodiments of the invention have been described, it is to be understood that these are by way of example only and that various modifications may be contemplated.

The invention claimed is:

1. A reconfigurable array for facilitating dynamic combination and distribution of RF/analogue signals, the reconfigurable array comprising:
   a number, $N_i$, of input devices for generating or supplying RF/analogue input signals;
   a number, $N_o$, of output devices for analysing or forwarding RF/analogue output signals;
   an optical switch matrix comprising a number, $N_p$, of ports, wherein each of the ports is an optical input or an optical output, wherein each input device is coupled to a respective port of the optical switch matrix at an optical input, wherein each output device is coupled to a respective port of the optical switch matrix at an optical output, and wherein the optical switch matrix is configurable to enable optical connection of any optical input to any optical output; and
   a plurality of splitters/combiners that each have multiple uncommon ports which couple to a single common port, wherein each splitter/combiner enables either fan-in of optical signals from the uncommon ports to the common port or fan-out of optical signals from the common port to the uncommon ports, and wherein each port of each splitter/combiner is coupled to a respective port of the optical switch matrix;
   wherein the plurality of splitters/combiners include at least one M:1 splitter/combiner, where M is a predetermined maximum number of RF/analogue signals for the reconfigurable array to fan-in or fan-out, where M is based on $N_i$ and $N_o$;
   wherein the reconfigurable array is configured to convert the RF/analogue input signals from the input devices into optical input signals for presentation at the ports of the optical switch matrix;
   wherein the reconfigurable array is configured to convert optical output signals from the optical switch matrix into the RF/analogue output signals for onward transmission or processing by the output devices; and
   wherein the optical switch matrix is an any-to-any optical switch matrix, wherein each of the ports is reconfigurable as either an optical input or an optical output, and wherein the any-to-any optical switch matrix is configurable to enable optical connection of any one of the ports to any other one of the ports.

2. The reconfigurable array of claim 1, wherein the input devices include one or more of:
   a receiving antenna;
   a software defined radio, SDR, transmitter; and
   an RF/analogue signal generator.

3. The reconfigurable array of claim 1, wherein the output devices include one or more of:
   a transmitting antenna;
   an SDR receiver; and
   an RF/analogue signal analyser.

4. The reconfigurable array of claim 1, wherein each input device is coupled to the respective port of the optical switch matrix by means of a respective electrical-to-optical, E/O, converter configured to convert the respective RF/analogue signal into a corresponding optical signal for distribution through the optical switch matrix.

5. The reconfigurable array of claim 4, wherein the E/O converters for each of the input devices are configured to generate optical signals having different optical wavelengths to one another.

6. The reconfigurable array of claim 1, wherein each output device is coupled to the respective port of the optical switch matrix by means of a respective optical-to-electrical, O/E, converter configured to convert an optical signal received from the optical switch matrix into an RF/analogue signal for analysis or onward transmission by the output device.

7. The reconfigurable array of claim 6, wherein each O/E converter is configured to provide automatic gain control by controlling a respective RF/analogue amplifier based on a measured light level of the received optical signal so as to adjust an output power of the respective RF/analogue signal to a predetermined level.

8. The reconfigurable array of claim 1, wherein the plurality of splitters/combiners are defined as follows:
   A is defined as max $(N_i, N_o)$ and B is defined as min $(N_i, N_o)$;
   for i=1, 2, . . . , the $i^{th}$ splitter/combiner is an $X_i$:1 splitter/combiner, where $X_i = A/i$ rounded down to the nearest integer;
   if $X_i < 2$, the $i^{th}$ splitter/combiner is excluded from the plurality of splitters/combiners and the number of splitters/combiners in the plurality of splitters/combiners is S; and
   the total number of ports is given by $p = N_i + N_o + \Sigma_{i=1}^{S}(X_i + 1)$.

9. The reconfigurable array of claim 8, wherein M=A such that the reconfigurable array is unconstrained to enable fan-in from all of the input devices or fan-out to all of the output devices if desired.

10. The reconfigurable array of claim 8, wherein M<A such that the reconfigurable array is constrained to enable fan-in from a maximum of M input devices or fan-out to a maximum of M output devices, and wherein each $X_i$ is constrained by $X_i \leq M$.

11. The reconfigurable array of claim 1, wherein the plurality of splitters/combiners include duplicate splitters/combiners to provide redundancy in case of failure of one or more of the plurality of splitters/combiners.

12. A reconfigurable array for facilitating dynamic combination and distribution of RF/analogue signals, the reconfigurable array comprising:
   a number, $N_i$, of input devices for generating or supplying RF/analogue input signals;
   a number, $N_o$, of output devices for analysing or forwarding RF/analogue output signals;
   an optical switch matrix comprising a number, $N_p$, of ports, wherein each of the ports is an optical input or an optical output, wherein each input device is coupled to a respective port of the optical switch matrix at an optical input, wherein each output device is coupled to a respective port of the optical switch matrix at an optical output, and wherein the optical switch matrix is configurable to enable optical connection of any optical input to any optical output; and a plurality of splitters/combiners that each have multiple uncommon ports which couple to a single common port, wherein each splitter/combiner enables either fan-in of optical signals from the uncommon ports to the common port or fan-out of optical signals from the common port to the uncommon ports, and wherein each port of each splitter/combiner is coupled to a respective port of the optical switch matrix;

wherein the plurality of splitters/combiners include at least one M:1 splitter/combiner, where M is a predetermined maximum number of RF/analogue signals for the reconfigurable array to fan-in or fan-out, where M is based on $N_i$ and $N_o$;

wherein the reconfigurable array is configured to convert the RF/analogue input signals from the input devices into optical input signals for presentation at the ports of the optical switch matrix;

wherein the reconfigurable array is configured to convert optical output signals from the optical switch matrix into the RF/analogue output signals for onward transmission or processing by the output devices;

wherein the optical switch matrix is a C×D optical switch matrix having a number, C, of ports on one side and a number, D, of ports on the other side, where C≤D;

wherein the C×D optical switch matrix is configurable to enable optical connection of any of the C ports on the one side to any of the D ports on the other side;

wherein the plurality of splitter/combiners comprises a first set of splitters/combiners having their uncommon ports connected to respective ones of the D ports of the optical switch matrix and having their common ports connected to respective ones of the C ports of the optical switch matrix; and wherein the plurality of splitter/combiners comprises a second set of splitters/combiners having their uncommon ports connected to respective ones of the C ports of the optical switch matrix and having their common ports connected to respective ones of the D ports of the optical switch matrix.

13. The reconfigurable array of claim 12, wherein $N_i > N_o$ such that each input device is coupled to a respective one of the C ports of the optical switch matrix, and each output device is coupled to a respective one of the D ports of the optical switch matrix.

14. The reconfigurable array of claim 12, wherein $N_i < N_o$ such that each input device is coupled to a respective one of the D ports of the optical switch matrix, and each output device is coupled to a respective one of the C ports of the optical switch matrix.

15. The reconfigurable array of claim 12, wherein the first set of splitters/combiners is defined as follows:

A is defined as max $(N_i, N_o)$ and B is defined as min $(N_i, N_o)$;

for i=1, 2, . . . , the $i^{th}$ splitter/combiner in the first set of splitters/combiners is an $X_i$:1 splitter/combiner, where $X_i$=A/i rounded down to the nearest integer; and if $X_i < 2$, the $i^{th}$ splitter/combiner is excluded from the first set of splitters/combiners and the number of splitters/combiners in the first set of splitters/combiners is S.

16. The reconfigurable array of claim 15, wherein each $X_i$ is constrained by $X_i \leq P$, where P is a predetermined maximum number of RF/analogue signals for the first set of splitters/combiners to fan-in or fan-out, where P≤A.

17. The reconfigurable array of claim 15, wherein the second set of splitters/combiners is defined as follows:

for i=1, 2, . . . , the $i^{th}$ splitter/combiner in the second set of splitters/combiners is an $Y_i$:1 splitter/combiner, where $Y_i$=B/i rounded down to the nearest integer; and if $Y_i < 2$, the $i^{th}$ splitter/combiner is excluded from the second set of splitters/combiners and the number of splitters/combiners in the second set of splitters/combiners is T.

18. The reconfigurable array of claim 17, wherein each $Y_i$ is constrained by $Y_i < Q$, where Q is a predetermined maximum number of RF/analogue signals for the second set of splitters/combiners to fan-in or fan-out, where Q≤B.

19. The reconfigurable array of claim 15, wherein the numbers C and D of ports required are given by:

$$C = A + S + \sum_{i=1}^{T} Y_i$$

$$D = B + T + \sum_{i=1}^{S} X_i.$$

* * * * *